US009800817B2

(12) United States Patent
Park et al.

(10) Patent No.: US 9,800,817 B2
(45) Date of Patent: Oct. 24, 2017

(54) METHOD FOR TRANSMITTING IMAGE AND ELECTRONIC DEVICE THEREOF

(71) Applicant: Samsung Electronics Co. Ltd., Suwon-si, Gyeonggi-do (KR)

(72) Inventors: Jeong-Hyun Park, Seongnam-si (KR); Young-Keun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 13/974,649

(22) Filed: Aug. 23, 2013

(65) Prior Publication Data

US 2014/0085487 A1 Mar. 27, 2014

(30) Foreign Application Priority Data

Sep. 25, 2012 (KR) ........................ 10-2012-0106334

(51) Int. Cl.
*H04N 5/44* (2011.01)
*G06F 3/0488* (2013.01)
(Continued)

(52) U.S. Cl.
CPC ........... *H04N 5/44* (2013.01); *G06F 3/04817* (2013.01); *G06F 3/04883* (2013.01); *H04L 51/046* (2013.01); *H04L 51/08* (2013.01); *H04N 1/0044* (2013.01); *H04N 1/00307* (2013.01); *H04N 1/00411* (2013.01); *H04N 1/00424* (2013.01); *H04N 1/00442* (2013.01); *H04N 1/32767* (2013.01); *H04N 5/23216* (2013.01);
(Continued)

(58) Field of Classification Search
CPC ............ H04N 5/23216; H04N 5/23293; G06F 3/0488
USPC ............................................ 348/207.1, 211.1
See application file for complete search history.

(56) References Cited

U.S. PATENT DOCUMENTS

| 6,191,807 B1 | 2/2001 | Hamada et al. |
| 2004/0268263 A1 | 12/2004 | Van et al. |

(Continued)

FOREIGN PATENT DOCUMENTS

| CN | 101656790 A | 2/2010 |
| EP | 1 898 346 A1 | 3/2008 |

(Continued)

OTHER PUBLICATIONS

Apple, iPhone User Guide for iOS 4.2 software, 2010, Apple inc.. all pages.*
Apple, ISO4.2 manual, 2011.*

*Primary Examiner* — Ahmed A Berhan
(74) *Attorney, Agent, or Firm* — Jefferson IP Law, LLP

(57) ABSTRACT

A method for transmitting an image and an electronic device thereof are provided. An image transmission method of an electronic device includes displaying a message transmission/reception history with at least one other electronic device, sensing a selection of a camera execution menu, displaying a preview screen of a camera within a screen in which the message transmission/reception history is displayed, detecting a touch on the displayed preview screen, if the displayed preview screen is touched, capturing an image of a subject, detecting a gesture for the captured image, and, if the gesture for the captured image is detected, transmitting the captured image to the at least one other electronic device according to the detected gesture.

15 Claims, 14 Drawing Sheets

(51) Int. Cl.
*H04L 12/58* (2006.01)
*G06F 3/0481* (2013.01)
*H04N 1/00* (2006.01)
*H04N 1/327* (2006.01)
*H04N 5/232* (2006.01)

(52) U.S. Cl.
CPC ....... *H04N 5/23293* (2013.01); *G06F 3/0488* (2013.01); *H04L 51/16* (2013.01); *H04N 2201/007* (2013.01); *H04N 2201/0039* (2013.01); *H04N 2201/0084* (2013.01); *H04N 2201/0096* (2013.01); *H04N 2201/0098* (2013.01)

(56) References Cited

U.S. PATENT DOCUMENTS

| | | |
|---|---|---|
| 2005/0136953 A1 | 6/2005 | Jo et al. |
| 2006/0123086 A1 | 6/2006 | Morris |
| 2006/0195787 A1 | 8/2006 | Topiwala et al. |
| 2007/0024734 A1* | 2/2007 | Headley .................. 348/333.07 |
| 2008/0052945 A1* | 3/2008 | Matas et al. ..................... 34/173 |
| 2008/0261569 A1 | 10/2008 | Britt et al. |
| 2010/0062803 A1 | 3/2010 | Yun et al. |
| 2010/0124906 A1* | 5/2010 | Hautala .................. G06Q 10/10 455/412.1 |
| 2012/0023425 A1 | 1/2012 | Hackborn et al. |

FOREIGN PATENT DOCUMENTS

| | | |
|---|---|---|
| EP | 2 244 430 A1 | 10/2010 |
| EP | 2 581 864 A2 | 4/2013 |
| KR | 10-2007-0063661 A | 6/2007 |
| KR | 10-2011-0019890 A | 3/2011 |
| WO | 2007/095275 A2 | 8/2007 |
| WO | 2009/071112 A1 | 6/2009 |
| WO | 2011/085248 A1 | 7/2011 |
| WO | 2011/107656 A1 | 9/2011 |

* cited by examiner

METHOD FOR TRANSMITTING IMAGE AND ELECTRONIC DEVICE THEREOF

PRIORITY

This application claims the benefit under 35 U.S.C. §119(a) of a Korean patent application filed on Sep. 25, 2012 in the Korean Intellectual Property Office and assigned Serial No. 10-2012-0106334, the entire disclosure of which is hereby incorporated by reference.

BACKGROUND OF THE INVENTION

1. Field of the Invention

The present invention relates to an electronic device. More particularly, the present invention relates to a method and apparatus for capturing and transmitting an image, in a state where a message transmission/reception history is displayed in an electronic device.

2. Description of the Related Art

Most of electronic devices such as recently launched smart phone, tablet Personal Computer (PC) and the like are equipped with cameras in order to capture an image. Particularly, as a camera function becomes increasingly important, various interfaces for interworking a camera application with other applications in the electronic device are being provided. For example, by interworking the camera application with a messenger application, the electronic device can capture an image through the camera application during messenger application execution and then transmit the captured image to at least one other electronic device through the messenger application.

In a case where the electronic device intends to capture and transmit an image during the execution of a general messenger application (e.g., Kakaotalk), the electronic device performs a process of, after converting a messenger application screen into a camera application screen, capturing an image of a subject through the camera application, and again converting the camera application screen into the messenger application screen to transmit the captured image. However, there is a shortcoming in that a user has to undergo a plurality of processes in order to capture and transmit the image during the execution of the messenger application as described above. Also, as the screen conversion from the messenger application screen to the camera application screen occurs as described above, the user suffers an inconvenience of, when a message is received while capturing the image, failing to determine the received message instantly.

According to this, there is a need to provide a method for capturing and transmitting an image without a trouble process during messenger application execution in an electronic device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for, without screen conversion, capturing and transmitting an image to at least one other electronic device, in a state where a message transmission/reception history is displayed in an electronic device.

Another aspect of the present invention is to provide a method and apparatus for displaying a camera preview screen within a screen in which a message transmission/reception history is displayed in an electronic device.

A further aspect of the present invention is to provide a method and apparatus for capturing an image through a camera preview screen displayed within a screen in which a message transmission/reception history is displayed in an electronic device.

Yet another aspect of the present invention is to provide a method and apparatus for, after capturing an image through a camera preview screen displayed within a screen in which a message transmission/reception history is displayed, transmitting the captured image to at least one other electronic device in an electronic device.

Still another aspect of the present invention is to provide a method and apparatus for, after capturing an image through a camera preview screen displayed within a screen in which a message transmission/reception history is displayed, storing the captured image in an electronic device.

Still another aspect of the present invention is to provide a method and apparatus for capturing a video through a camera preview screen displayed within a screen in which a message transmission/reception history is displayed in an electronic device.

The above aspects are addressed by providing a method for transmitting an image and an electronic device thereof.

In accordance with an aspect of the present invention, an image transmission method of an electronic device is provided. The method includes displaying a message transmission/reception history with at least one other electronic device, sensing a selection of a camera execution menu, displaying a preview screen of a camera within a screen in which the message transmission/reception history is displayed, detecting a touch on the displayed preview screen, if the displayed preview screen is touched, capturing an image of a subject, detecting a gesture for the captured image, and, if the gesture for the captured image is detected, transmitting the captured image to the at least one other electronic device according to the detected gesture.

In accordance with another aspect of the present invention, an image transmission electronic device is provided. The device includes one or more processors configured to execute one or more programs, a touch sensing display configured to detect the presence and location of a touch, and a memory configured to store data and instructions. The one or more programs are stored in the memory and comprise instructions to display a message transmission/reception history with at least one other electronic device, to sense a selection of a camera execution menu, to display a preview screen of a camera within a screen in which the message transmission/reception history is displayed, to detect a touch on the displayed preview screen, if the preview screen is touched, to capture an image of a subject, to detect a gesture for the captured image, and, if the gesture for the captured image is detected, to transmit the captured image to the at least one other electronic device according to the detected gesture.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, an electronic device includes a mobile communication terminal with a camera, a smart phone, a tablet Personal Computer (PC), a digital camera, a laptop computer, a netbook computer, a computer and the like.

Figure 1A:
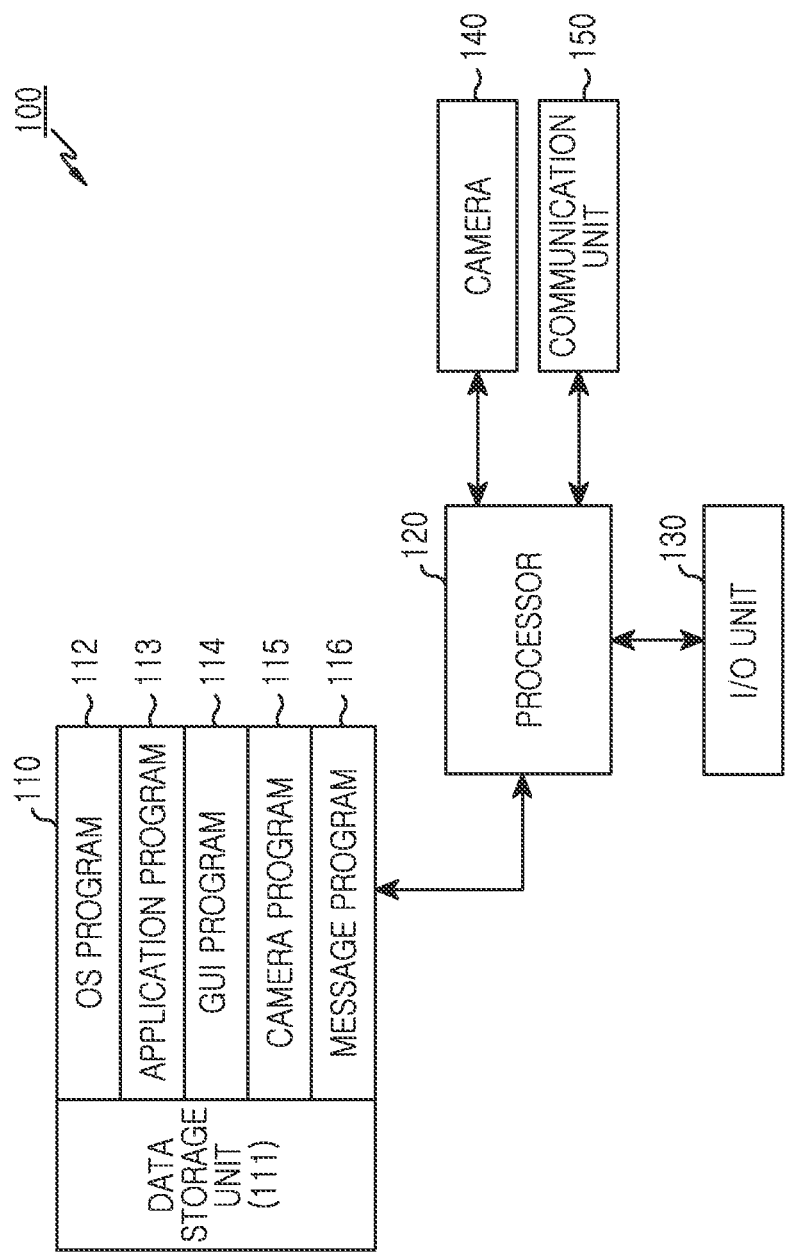
FIG. 1A is a block diagram illustrating a construction of an electronic device according to an exemplary embodiment of the present invention.

FIG. 1A is a block diagram illustrating a construction of an electronic device according to an exemplary embodiment of the present invention.

Referring to FIG. 1A, the electronic device 100 includes a memory 110, a processor 120, an Input/Output (IO) unit 130, a camera 140, and a communication unit 150. The memory 110 and the processor 120 can be composed of a plurality of memories 110 and a plurality of processors 120, respectively.

The memory 110 includes a data storage unit 111, an Operating System (OS) program 112, an application program 113, a Graphical User Interface (GUI) program 114, a camera program 115, a message program 116 and the like. Also, the program that is a software constituent element can be expressed as a set of instructions, so the program may be expressed as an instruction set. The program is also expressed as a module.

The memory 110 can store at least one or more programs including instructions performing an exemplary embodiment of the present invention.

The data storage unit 111 stores data generated during the execution of a function corresponding to the program stored in the memory 110. The data storage unit 111 according to the present exemplary embodiment can store an image. At this time, the stored image includes at least one of an image captured through the camera 140, a previously stored image, and an image received from at least one other electronic device or a server. Further, the data storage unit 111 can store a message transmission/reception history by electronic device.

The OS software 112 (for example, a built-in operating system such as WINDOWS, LINUX, Darwin, RTXC, UNIX, OS X, or VxWorks) includes various software constituent elements controlling general system operations. Control of the general system operations includes memory management and control, storage hardware (device) control and management, power control and management and the like. Further, the OS software 112 performs a function of making smooth communication between various hardware (devices) and software constituent elements (programs).

The application program 113 includes applications of a browser, an electronic mail (e-mail), a message, word processing, an address book, a widget, Digital Right Management (DRM), voice recognition, voice replication, a position determining function, a location-based service, a call and the like.

The graphical user interface program 114 includes at least one software constituent element providing a user interface using a graphic between a user and the electronic device 100. That is, the graphical user interface program 114 includes at least one software constituent element for displaying user interface information on the I/O unit 130. According to the present exemplary embodiment, the graphical user interface program 114 includes an instruction for displaying a message transmission/reception history with at least one other electronic device. At this time, the at least one other electronic device represents a conversation partner's electronic device transmitting/receiving a message, and the message transmission/reception history represents a transmission/reception history (e.g., transmission message content, message transmission time, reception message content, message reception time, conversation partner's confirmation or non-confirmation for a transmission message and the like) of a message transmitted/received between the user of the electronic device 100 and a conversation partner of at least one other electronic device.

Also, the graphical user interface program 114 includes an instruction for displaying a preview screen of the camera 140 within a screen in which a message transmission/reception history is displayed. At this time, the preview screen can be displayed in any region within the screen in which the message transmission/reception history is displayed or can be displayed within a talk balloon in which message content is displayed. Also, the graphical user interface program 114 includes an instruction for moving the preview screen from a current region to another region by the camera program 115. That is, the preview screen is displayed in a lower right region within the screen in which the message transmission/reception history is displayed in the drawing illustrating exemplary embodiments of the present invention described below. But, according to user control, the preview screen can be moved even to any location within the screen in which the message transmission/reception history is displayed.

Also, if a multi touch on a preview screen is sensed by the camera program 115, the graphical user interface program 114 can zoom in or out the preview screen according to the sensed multi touch and display the zoomed preview screen. Also, the graphical user interface program 114 can display the preview screen in a full screen region in which a message transmission/reception history is displayed. Here, in a case where the preview screen is displayed in the full screen region in which the message transmission/reception history is displayed, the preview screen can be displayed as a wallpaper screen of the message transmission/reception history.

Also, the graphical user interface program 114 can arrange the displayed preview screen in front of a message window, or arrange the displayed preview screen as the wallpaper in rear of the message window.

Further, the graphical user interface program 114 includes an instruction for displaying recently stored at least one image around the preview screen. For example, the graphical user interface program 114 can display the recently stored at least one image at a lower end of the preview screen.

The camera program 115 includes a camera related software constituent element enabling camera related processes and functions. In the present exemplary embodiment, if a camera execution menu is selected in a state in which a message transmission/reception history is displayed, the camera program 115 can execute the camera 140 to display a camera preview screen in any region of a screen in which a message transmission/reception history is displayed. For example, the camera program 115 includes an instruction for displaying the camera preview screen in any region within the screen in which the message transmission/reception history with at least one other electronic device is displayed as illustrated in FIG. 6, or displaying the camera preview screen within a talk balloon within the screen in which the message transmission/reception history with the at least one other electronic device is displayed as illustrated in FIG. 7.

Figure 6:
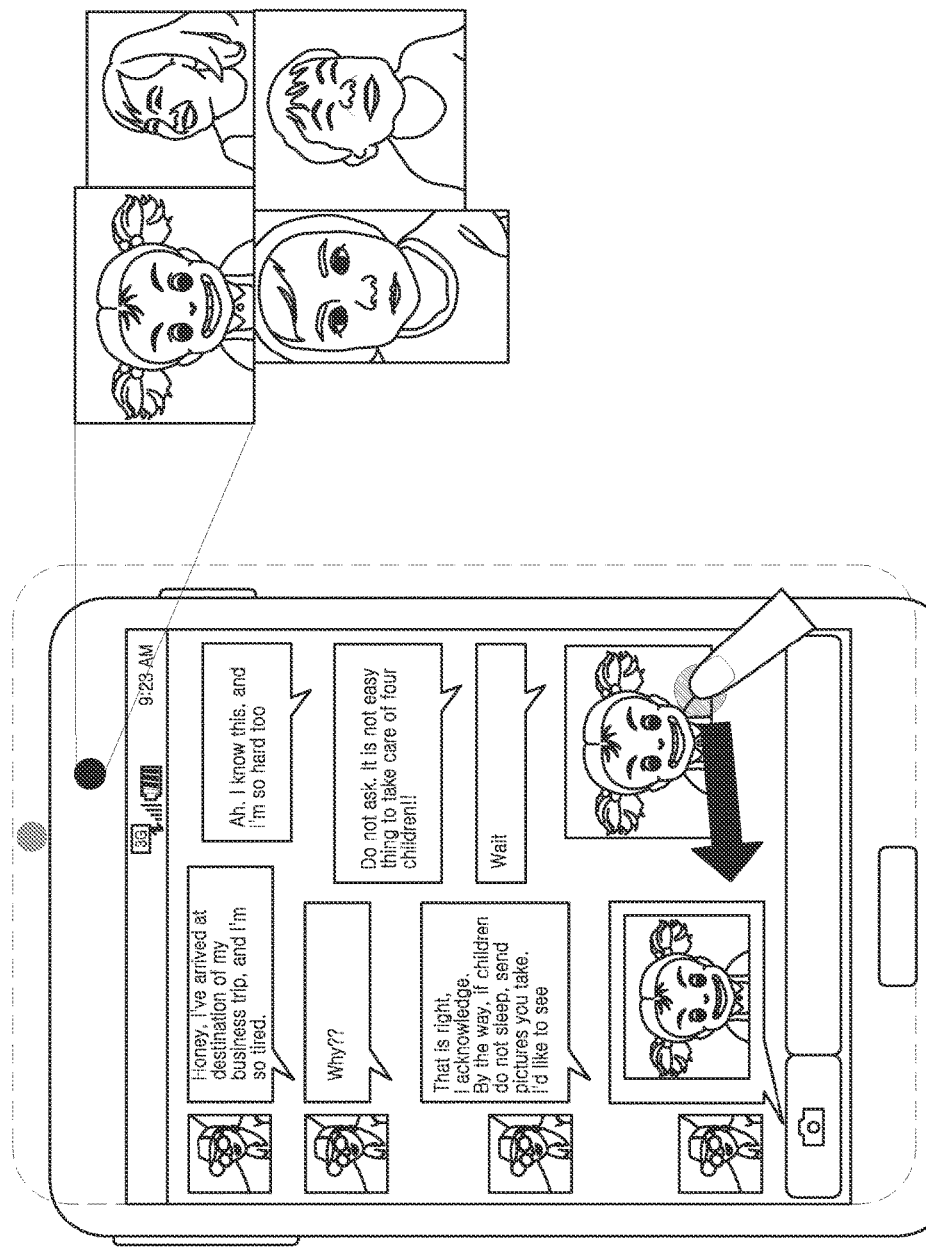
FIG. 6 is a diagram illustrating an example of displaying a preview screen in any region of a screen in which a message transmission/reception history is displayed, to capture and transmit an image in an electronic device according to an exemplary embodiment of the present invention.
Figure 7:
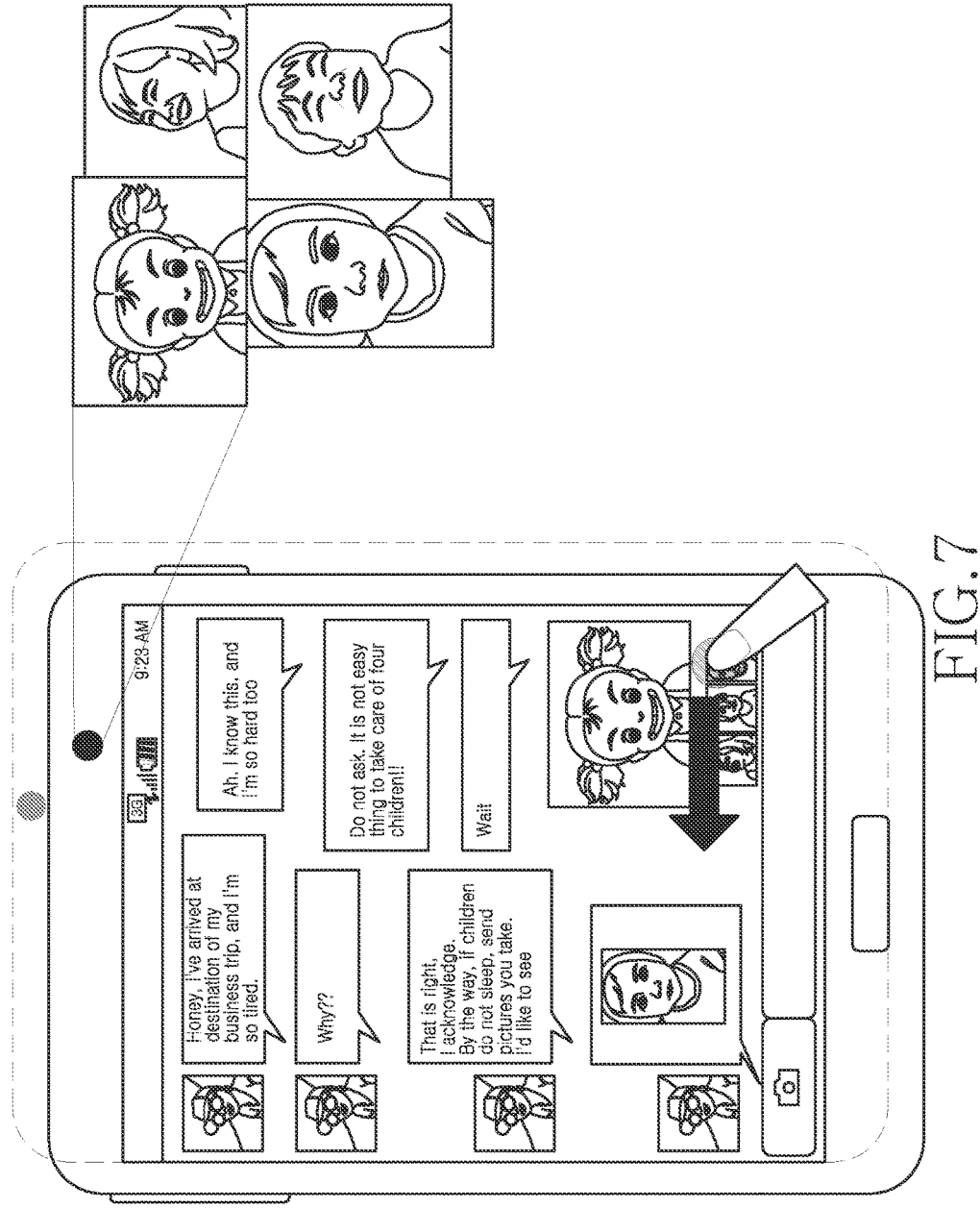
FIG. 7 is a diagram illustrating an example of displaying a preview screen within a talk balloon including a transmission message, to capture and transmit an image in an electronic device according to an exemplary embodiment of the present invention.

FIG. 6 is a diagram illustrating an example of displaying a preview screen in any region of a screen in which a message transmission/reception history is displayed, to capture and transmit an image in an electronic device according to an exemplary embodiment of the present invention. FIG. 7 is a diagram illustrating an example of displaying a preview screen within a talk balloon including a transmission message, to capture and transmit an image in an electronic device according to an exemplary embodiment of the present invention.

At this time, the camera preview screen can be arranged and displayed in front of a message window, or can be arranged and displayed as the wallpaper in rear of the message window. The arrangement of the camera preview screen can be set in a setting step, and can be changed according to user control.

Further, the camera program 115 can display recently stored at least one or more images around a region in which a camera preview screen is displayed. At this time, whether to display only the camera preview screen or whether to concurrently display the camera preview screen and the recently stored at least one or more images can be determined according to user control or can be previously determined in a setting step.

Further, the camera program 115 includes an instruction for recognizing that a multi touch on a preview screen region is sensed through the I/O unit 130, and performing a function corresponding to the sensed multi touch. For example, if at least two or more drags making progress in different directions about the preview screen region are sensed, the camera program 115 can zoom in or out the preview screen region depending on progress lengths of the sensed drags and/or progress locations thereof. At this time, if the sensed drags make progress a preset threshold distance or more, the camera program 115 zooms in the preview screen region by as much as a size of a screen in which a message transmission/reception history is displayed, thereby being capable of displaying the preview screen like a wallpaper screen of the screen in which the message transmission/reception history is displayed as illustrated in FIG. 9.

Figure 9:
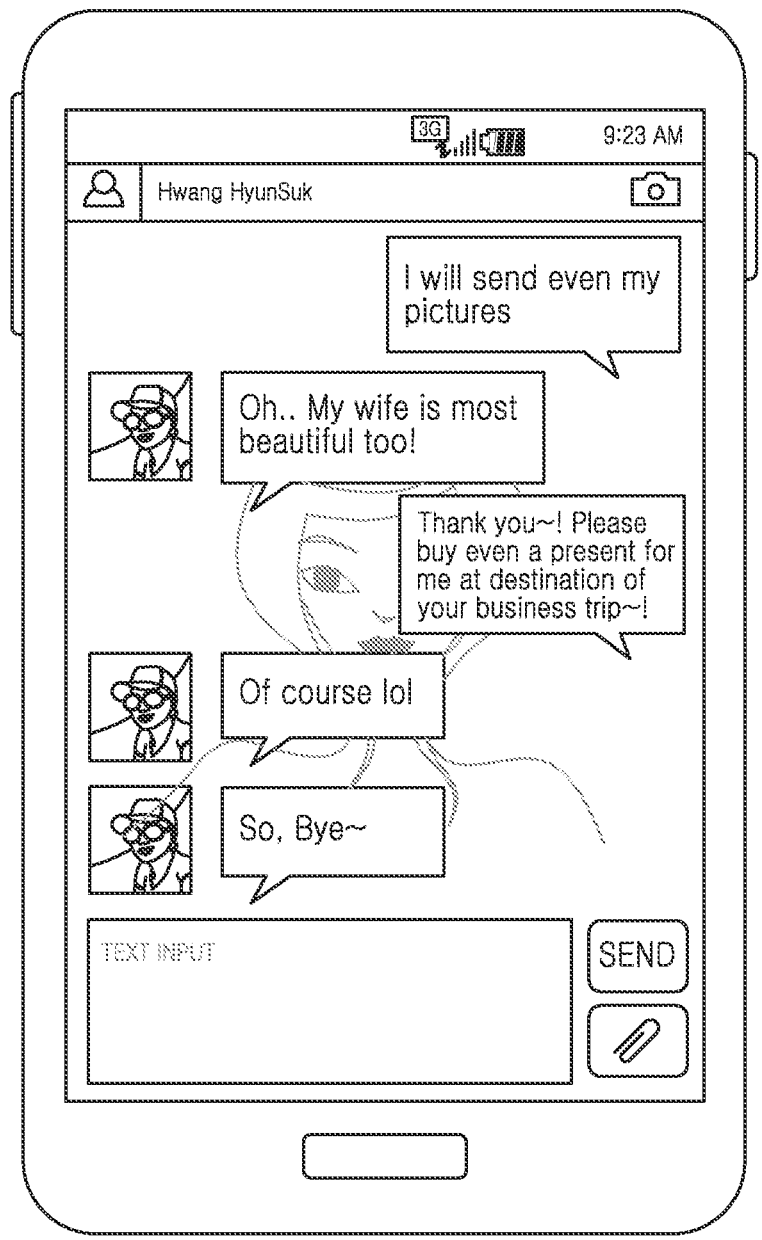
FIG. 9 is a diagram illustrating an example of zooming in a preview screen region by as much as a size of a screen in which a message transmission/reception history is displayed in an electronic device according to an exemplary embodiment of the present invention.

FIG. 9 is a diagram illustrating an example of zooming in a preview screen region by as much as a size of a screen in which a message transmission/reception history is displayed in an electronic device according to an exemplary embodiment of the present invention.

For another example, if the sensed multi touch on the preview screen region is dragged so as to be getting closer to each other, the camera program 115 can zoom out the preview screen region depending on progress lengths of the sensed drags and/or progress locations thereof. Also, if at least two or more drags making progress in the same direction about the preview screen region are sensed, the camera program 115 can move the preview screen from a current region to another region according to the progress locations of the sensed drags to display the moved preview screen.

Further, if a touch on a camera preview screen is sensed, the camera program 115 captures an image of a subject. Particularly, in a case where the preview screen is zoomed in by as much as a full screen in which a message transmission/reception history is displayed, if a touch on a region in which the message transmission/reception history is not displayed is sensed among a region of the zoomed-in preview screen, the camera program 115 can capture the image of the subject.

If the image of the subject is captured due to the sensing of the touch on the preview screen, the camera program 115 converts the preview screen into a screen displaying a captured image. That is, the camera program 115 displays the captured image instead of the preview screen in the preview screen region. After the image is captured, if a cancel menu is selected by user control, the camera program 115 again converts the screen displaying the captured image into the preview screen.

Also, if a touch on a recently stored image displayed around a preview screen region is sensed, the camera program 115 displays the touch-sensed image instead of the preview screen in the preview screen region. After displaying of the touch-sensed image, if a cancel menu is selected by user control, the camera program 115 again converts a screen displaying the touch-sensed image into the preview screen.

Further, the camera program 115 includes an instruction for, if a gesture for a captured image is sensed, transmitting the captured image to at least one other electronic device. At this time, the gesture includes at least one of a drag, a multi touch double tap, and a tap of a predetermined period of time. For example, if the double tap is sensed for the captured image, the camera program 115 can transmit the captured image to at least one other electronic device associated with a message transmission/reception history that is being displayed at least on a screen.

Figure 4:
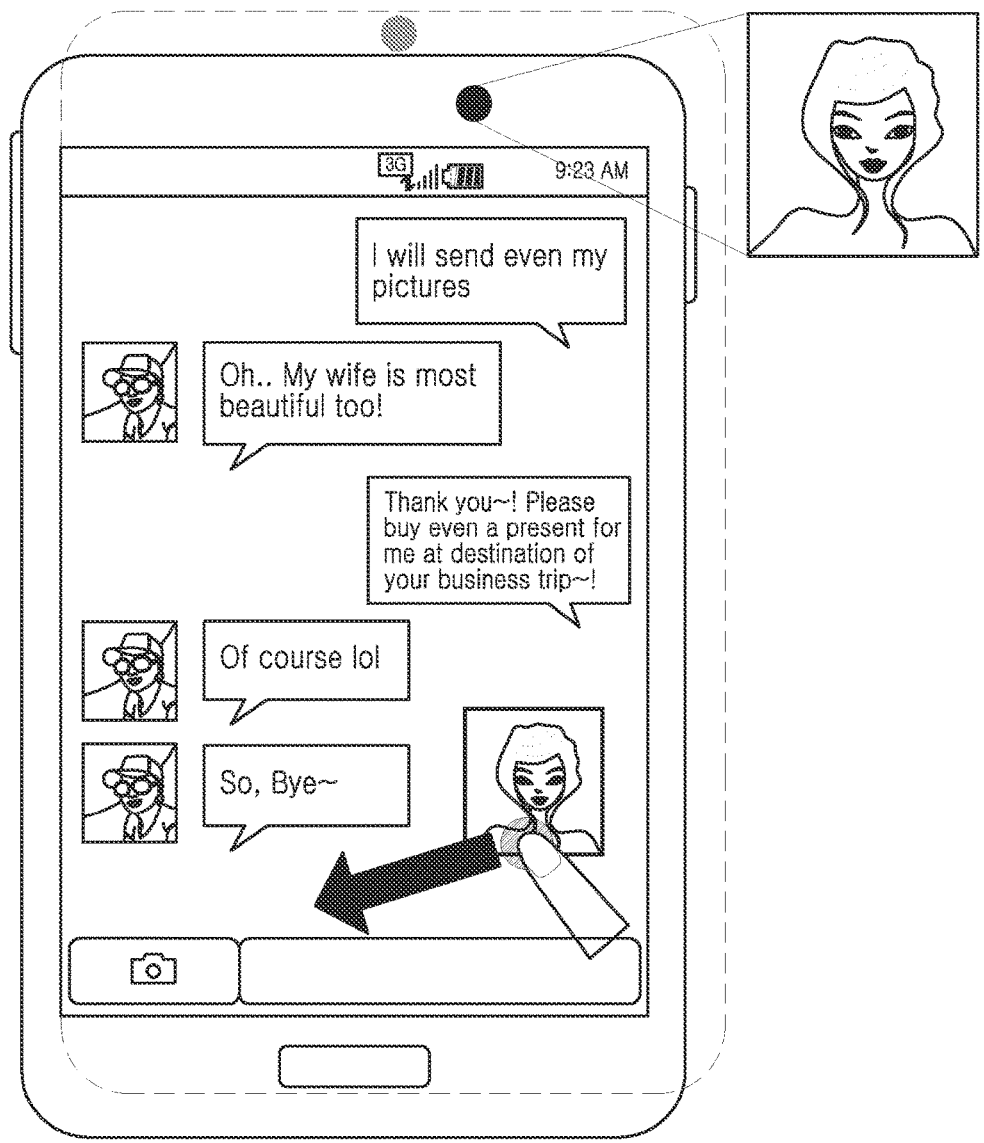
FIG. 4 is a diagram illustrating an example of capturing and transmitting an image within a screen in which a message transmission/reception history is displayed in an electronic device according to an exemplary embodiment of the present invention.

FIG. 4 is a diagram illustrating an example of capturing and transmitting an image within a screen in which a message transmission/reception history is displayed in an electronic device according to an exemplary embodiment of the present invention.

For another example, as illustrated in FIG. 4, if a drag making progress from the inside of a captured image to the outside thereof is sensed, the camera program 115 can transmit the captured image to at least one other electronic device. Particularly, if a drag makes progress from the inside of the captured image to a direction in which a message received from at least one other electronic device has been displayed, the camera program 115 can transmit the captured image to the at least one other electronic device.

Further, the camera program 115 can split a screen region in which a message transmission/reception history is displayed into at least two regions and then, store or transmit a corresponding image according to which region among the split screen regions a drag sensed for a captured image makes progress to. For example, assuming that the camera program 115 splits a screen region into three regions, if a drag for a captured image is sensed only within a 1st screen region, the camera program 115 can store the captured image in the data storage unit 111 of the memory 110, without transmitting the captured image to the at least one other electronic device. For another example, if it is sensed that the drag for the captured image makes progress from the 1st screen region to a 2nd screen region, the camera program 115 can store the captured image in the data storage unit 111 of the memory 100 while transmitting the captured image to the at least one other electronic device. For further example, if it is sensed that the drag for the captured image makes progress from the 1st screen region to a 3rd screen region, the camera program 115 can transmit the captured image to the at least one other electronic device, without storing the captured image in the data storage unit 111 of the memory 110.

Also, if a gesture for a recently stored image is sensed, the camera program 115 can transmit a gesture-sensed image to at least one other electronic device. For example, if it is sensed that a drag makes progress from the inside of a recently stored image displayed around a preview screen region to the outside thereof, the camera program 115 can transmit the drag-sensed image to at least one other electronic device. At this time, if a touch on a specific image among recently stored images displayed around the preview screen region is sensed, the camera program 115 can display the touch-sensed specific image in the preview screen region and then, sense a separate drag for the displayed image to transmit the drag-sensed image to the at least one other electronic device. Also, if the drag for the specific image among the recently stored images displayed around the preview screen region is sensed, the camera program 115 can just transmit the drag-sensed specific image to the at least one other electronic device, without displaying the drag-sensed specific image in the preview screen region.

Also, the camera program 115 includes an instruction for displaying an icon for capturing mode conversion within a screen in which a message transmission/reception history is displayed and, if the icon is selected by user control, converting an image (or still picture) capturing mode into a video capturing mode or converting the video capturing mode into the image capturing mode. Also, the camera program 115 can sense a preset gesture to convert a capturing mode. For example, the camera program 115 can sense a double tap, a tap of a predetermined period of time, and a single touch or multi touch making progress in a preset shape to convert the capturing mode.

After converting the image capturing mode into the video capturing mode, if a tap of a predetermined period of time for a preview screen is sensed, the camera program 115 can capture a video for a time during which the tap is sensed. For example, if a tap of one minute for the preview screen is sensed in the video capturing mode, the camera program 115 can capture a video for one minute.

The message program 116 can control the communication unit 150 for the sake of message transmission/reception with at least one other electronic device.

The processor 120 can be, although not illustrated, composed of at least one processor and peripheral interface. Also, the processor 120 executes a specific program (i.e., an instruction set) stored in the memory 110 to perform a plurality of specific functions corresponding to the executed program.

The I/O unit 130, which is a touch-sensitive display, provides an interface for touch input/output between the electronic device 100 and a user. The I/O unit 130 is a medium for sensing a touch (or a contact) through a touch sensor (not shown), forwarding a sensed touch input to the electronic device 100, and visually providing an output of the electronic device 100 to the user. That is, the I/O unit 130 provides a visual output based on a text, a graphic, and a video to the user, in response to the touch input.

The I/O unit 130 includes a touch sense surface sensing a user's touch input, to sense a user's touch input of a haptic contact scheme, a tactile contact scheme or a combination scheme of them. For example, a touch sense point of the I/O unit 130 corresponds to a digit that is used for contact to the touch sense surface. Also, the I/O unit 130 senses a contact of an external device such as a stylus pen and the like through the touch sense surface. The detected contact is transformed into interaction corresponding to a user interface object (e.g., a soft key) displayed on the I/O unit 130.

The I/O unit 130 provides an interface for touch input/output between the electronic device 100 and a user. In detail, the I/O unit 130 is a medium for forwarding a user's touch input to the electronic device 100, and visually providing an output of the electronic device 100 to the user. The I/O unit 130 can use various display technologies such as a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED). The I/O unit 130 of the present exemplary embodiment is not limited to a touch screen using these display technologies. Also, the I/O unit 130 can sense a start of a contact to a touch sense surface, a movement of the contact, or an interruption or termination of the contact, by using various touch detection (or sensing) technologies such as capacitive detection, resistive detection, infrared detection and surface acoustic wave detection technologies. The I/O unit 130 according to the present exemplary embodiment can display a message transmission/reception history and can display a camera preview screen in any region of a screen in which the message transmission/reception history is displayed. Further, the I/O unit 130 can sense a gesture for the displayed preview screen. At this time, the gesture includes at least one of a tap, a double tap, a drag, and a tap of a predetermined period of time.

The camera 140 can capture an image of a subject according to user control. Particularly, if a camera execution menu is selected in a state where a message transmission/reception history is displayed, the camera 140 according to the present exemplary embodiment can be executed to capture an image of the subject. Further, in a video capturing mode, the camera 140 can capture a video during a time during which a touch is sensed for a preview screen by control of the camera program 115. At this time, the camera 140 can be provided at at least one surface among a front surface of the electronic device 100 and a rear surface thereof. In a case where the camera 140 is provided at all of the front surface and the rear surface, the rear surface camera 140 is executed as default. At this time, the executed camera among the front and rear surface cameras can be changed according to user control, and can be previously determined in a setting step.

The communication unit 150 can include a radio frequency receiver and transceiver and/or an optical (e.g., infrared) receiver and transceiver. For example, the communication unit 150 can include a wireless communication system supporting any one of a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Fidelity (Wi-Fi) network, Near Field Communication (NFC), Infrared Data Association (IrDA), a Wireless interoperability for Microwave Access (WiMAX) network or/and a Bluetooth network. A wireless communication system according to an exemplary embodiment of the present invention is not limited to the wireless communication system supporting the aforementioned networks, and may be a wireless communication system supporting other networks. The communication unit 150 according to the present exemplary embodiment can transmit an image and a video to at least one other electronic device by the camera program 115. Further, the communication unit 150 according to the present exemplary embodiment can receive an image and a video from at least one other electronic device. Also, the communication unit 150 can transmit/receive a message with at least one other electronic device.

Figure 1B:
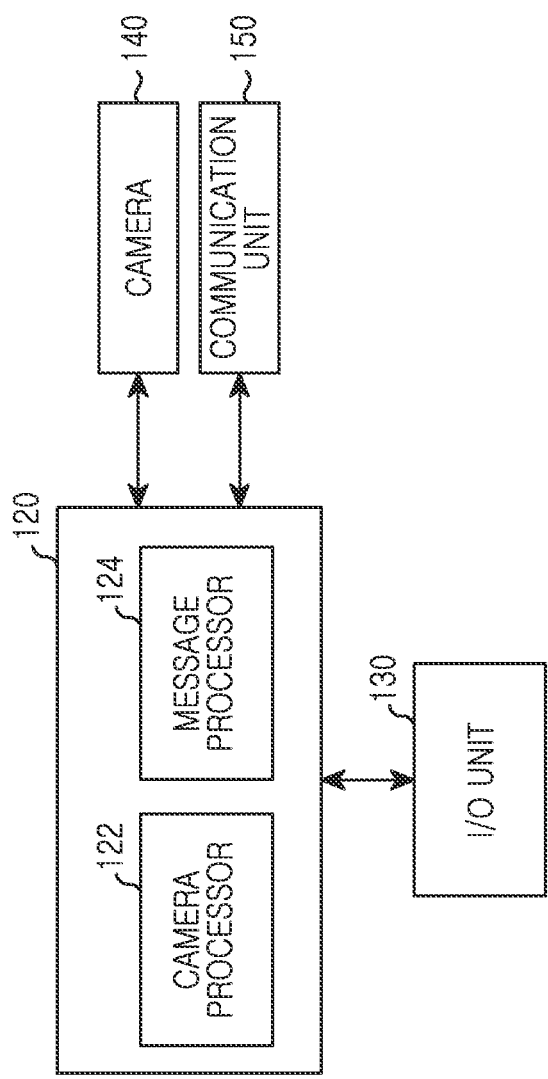
FIG. 1B is a diagram illustrating a construction of a processor of an electronic device according to an exemplary embodiment of the present invention.

FIG. 1B illustrates a construction of a processor of an electronic device according to an exemplary embodiment of the present invention.

Referring to FIG. 1B, the processor 120 includes a camera processor 122 and a message control processor 124. According to this, the processor 120 directly performs functions of the camera program 115 and the message program 116 in FIG. 1A.

That is, the camera processor 122 includes a camera related software constituent element enabling camera related processes and functions. In the present exemplary embodiment, if a camera execution menu is selected in a state in which a message transmission/reception history is displayed, the camera processor 122 can execute the camera 140 to display a camera preview screen in any region of a screen in which a message transmission/reception history is displayed. For example, the camera processor 122 performs a function for displaying the camera preview screen in any region within the screen in which the message transmission/reception history with at least one other electronic device is displayed as illustrated in FIG. 6, or displaying the camera preview screen within a talk balloon within the screen in which the message transmission/reception history with the at least one other electronic device is displayed as illustrated in FIG. 7. At this time, the camera preview screen can be arranged and displayed in front of a message window, or can be arranged and displayed as the wallpaper in rear of the message window. The arrangement of the camera preview screen can be set in a setting step, and can be changed according to user control.

Further, the camera processor 122 can display recently stored at least one or more images around a region in which a camera preview screen is displayed. At this time, whether to display only the camera preview screen or whether to concurrently display the camera preview screen and the recently stored at least one or more images can be determined according to user control or can be previously determined in a setting step.

Further, the camera processor 122 performs a control function for recognizing that a multi touch on a preview screen region is sensed through the I/O unit 130, and performing a function corresponding to the sensed multi touch. For example, if at least two or more drags making progress in different directions about the preview screen region are sensed, the camera processor 122 can zoom in or out the preview screen region depending on progress lengths of the sensed drags and/or progress locations thereof. At this time, if the sensed drags make progress a preset threshold distance or more, the camera processor 122 zooms in the preview screen region by as much as a size of a screen in which a message transmission/reception history is displayed, thereby being capable of displaying the preview screen like a wallpaper screen of the screen in which the message transmission/reception history is displayed as illustrated in FIG. 9. For another example, if the sensed multi touch on the preview screen region is dragged so as to be getting closer to each other, the camera processor 122 can zoom out the preview screen region depending on progress lengths of the sensed drags and/or progress locations thereof. Also, if at least two or more drags making progress in the same direction about the preview screen region are sensed, the camera processor 122 can move the preview screen from a current region to another region according to the progress locations of the sensed drags to display the moved preview screen.

Further, if a touch on a camera preview screen is sensed, the camera processor 122 captures an image of a subject. Particularly, in a case where the preview screen is zoomed in by as much as a full screen in which a message transmission/reception history is displayed, if a touch on a region in which the message transmission/reception history is not displayed is sensed among a region of the zoomed-in preview screen, the camera processor 122 can capture an image of the subject.

If the image of the subject is captured due to the sensing of the touch on the preview screen, the camera processor 122 converts the preview screen into a captured image display screen. That is, the camera processor 122 displays a captured image instead of the preview screen in the preview screen region. After the image is captured, if a cancel menu is selected by user control, the camera processor 122 again converts the captured image display screen into the preview screen.

Also, if a touch on a recently stored image displayed around a preview screen region is sensed, the camera processor 122 displays the touch-sensed image instead of the preview screen in the preview screen region. After displaying of the touch-sensed image, if a cancel menu is selected by user control, the camera processor 122 again converts a screen displaying the touch-sensed image into the preview screen.

Further, the camera processor 122 performs a control function for, if a gesture for a captured image is sensed, transmitting the captured image to at least one other electronic device. At this time, the gesture includes at least one of a drag, a multi touch double tap, and a tap of a predetermined period of time. For example, if the double tap is sensed for the captured image, the camera processor 122 can transmit the captured image to at least one other electronic device associated with a message transmission/reception history that is being displayed at least on a screen. For another example, as illustrated in FIG. 4, if a drag making progress from the inside of a captured image to the outside thereof is sensed, the camera processor 122 can transmit the captured image to at least one other electronic device. Particularly, if a drag makes progress from the inside of the captured image to a direction in which a message received from at least one other electronic device has been displayed, the camera processor 122 can transmit the captured image to the at least one other electronic device.

Further, the camera processor 122 can split a screen region in which a message transmission/reception history is displayed into at least two regions and then, store or transmit a corresponding image according to which region among the split screen regions a drag sensed for a captured image makes progress to. For example, assuming that the camera processor 122 splits a screen region into three regions, if a drag for a captured image is sensed only within a 1st screen region, the camera processor 122 can store the captured image in the data storage unit 111 of the memory 110, without transmitting the captured image to at least one other electronic device. For another example, if it is sensed that the drag for the captured image makes progress from the 1st screen region to a 2nd screen region, the camera processor 122 can store the captured image in the data storage unit 111 of the memory 100 while transmitting the captured image to the at least one other electronic device. For a further example, if it is sensed that the drag for the captured image makes progress from the 1st screen region to a 3rd screen region, the camera processor 122 can transmit the captured image to at least one other electronic device, without storing the captured image in the data storage unit 111 of the memory 110.

Also, if a gesture for a recently stored image is sensed, the camera processor 122 can transmit a gesture-sensed image to at least one other electronic device. For example, if it is sensed that a drag makes progress from the inside of a recently stored image displayed around a preview screen region to the outside thereof, the camera processor 122 can transmit the drag-sensed image to at least one other electronic device. At this time, if a touch on a specific image among recently stored images displayed around the preview screen region is sensed, the camera processor 122 can display the touch-sensed specific image in the preview screen region and then, sense a separate drag for the displayed image to transmit the drag-sensed image to the at least one other electronic device. Also, if the drag for the specific image among the recently stored images displayed around the preview screen region is sensed, the camera processor 122 can transmit the drag-sensed specific image to the at least one other electronic device, without displaying the drag-sensed specific image in the preview screen region.

Also, the camera processor 122 performs a function for displaying an icon for capturing mode conversion within a screen in which a message transmission/reception history is displayed and, if the icon is selected by user control, converting an image (or still picture) capturing mode into a video capturing mode or converting the video capturing mode into the image capturing mode. Also, the camera processor 122 can sense a preset gesture to convert a capturing mode. For example, the camera processor 122 can sense a double tap, a tap of a predetermined period of time, and a single touch or multi touch making progress in a preset shape to convert the capturing mode.

After converting the image capturing mode into the video capturing mode, if a tap of a predetermined period of time for a preview screen is sensed, the camera processor 122 can capture a video for a time during which the tap is sensed. For example, if a tap of one minute for the preview screen is sensed in the video capturing mode, the camera processor 122 can capture a video for one minute.

The message processor 124 can control the communication unit 150 for the sake of message transmission/reception with at least one other electronic device.

Figure 2A:
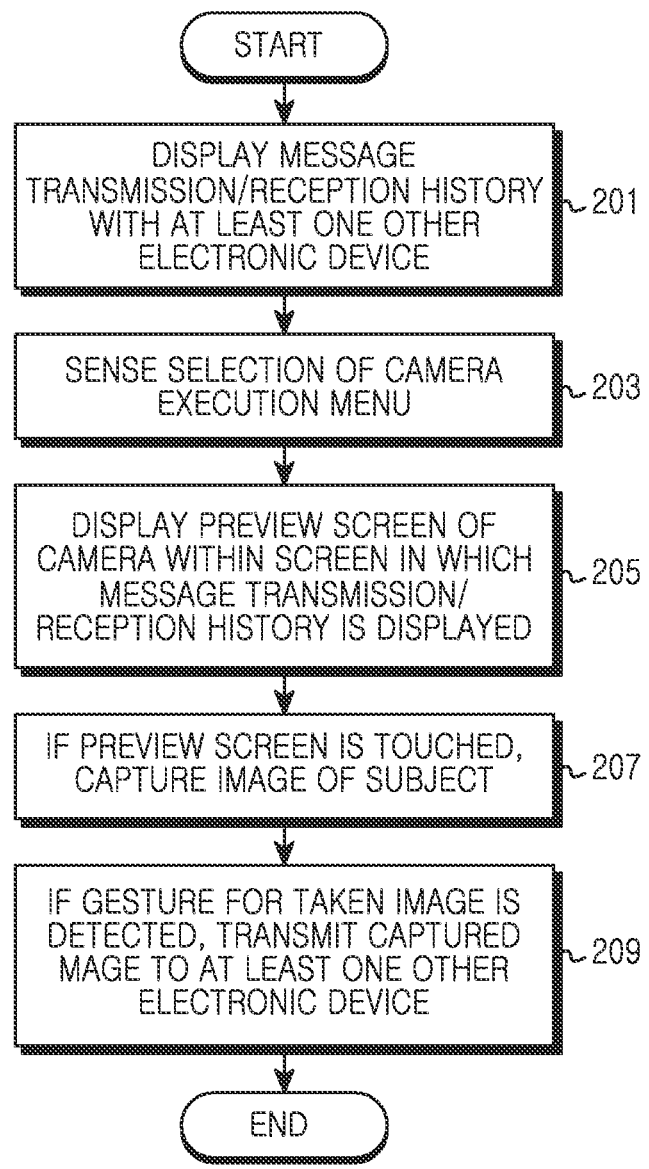
FIG. 2A is a flowchart illustrating a procedure of transmitting a captured image to at least one other electronic device in an electronic device according to an exemplary embodiment of the present invention.

FIG. 2A illustrates a procedure of transmitting a captured image to at least one other electronic device in an electronic device according to an exemplary embodiment of the present invention.

Referring to FIG. 2A, in step 201, the electronic device 100 displays a message transmission/reception history with at least one other electronic device. At this time, the message transmission/reception history represents a transmission/reception history of a message transmitted/received between the user of the electronic device 100 and a conversation partner of at least one other electronic device.

After that, the electronic device 100 proceeds to step 203 and senses a selection of a camera execution menu. At this time, the electronic device 100 can display a menu (e.g., a camera icon) for camera execution within a screen in which the message transmission/reception history is displayed.

In step 205, the electronic device 100 can display a camera preview screen within the screen in which the message transmission/reception history is displayed. At this time, the electronic device 100 can display the camera preview screen in any region within the screen in which the message transmission/reception history is displayed, or display the camera preview screen within a talk balloon including a transmission message.

Next, the electronic device 100 proceeds to step 207 and can capture an image of a subject if a touch on the preview screen is sensed. At this time, the electronic device 100 can display a captured image in a preview screen region. Further, in a video capturing mode, the electronic device 100 can capture a video for a time during which the preview screen is touched.

After that, the electronic device 100 proceeds to step 209 and transmits the captured image to the at least one other electronic device if a gesture for the captured image is detected. At this time, the gesture includes at least one of a double tap, a drag, and a tap of a predetermined period of time. For example, if the double tap for the captured image is sensed, the electronic device 100 can transmit the captured image to the at least one other electronic device. For another example, if a drag making progress from the inside of the captured image to the outside thereof is sensed, the electronic device 100 can transmit the captured image to the at least one other electronic device. At this time, the outside of the captured image means a direction in which a message received from the at least one other electronic device is displayed within the screen in which the message transmission/reception history is displayed.

Figure 2B:
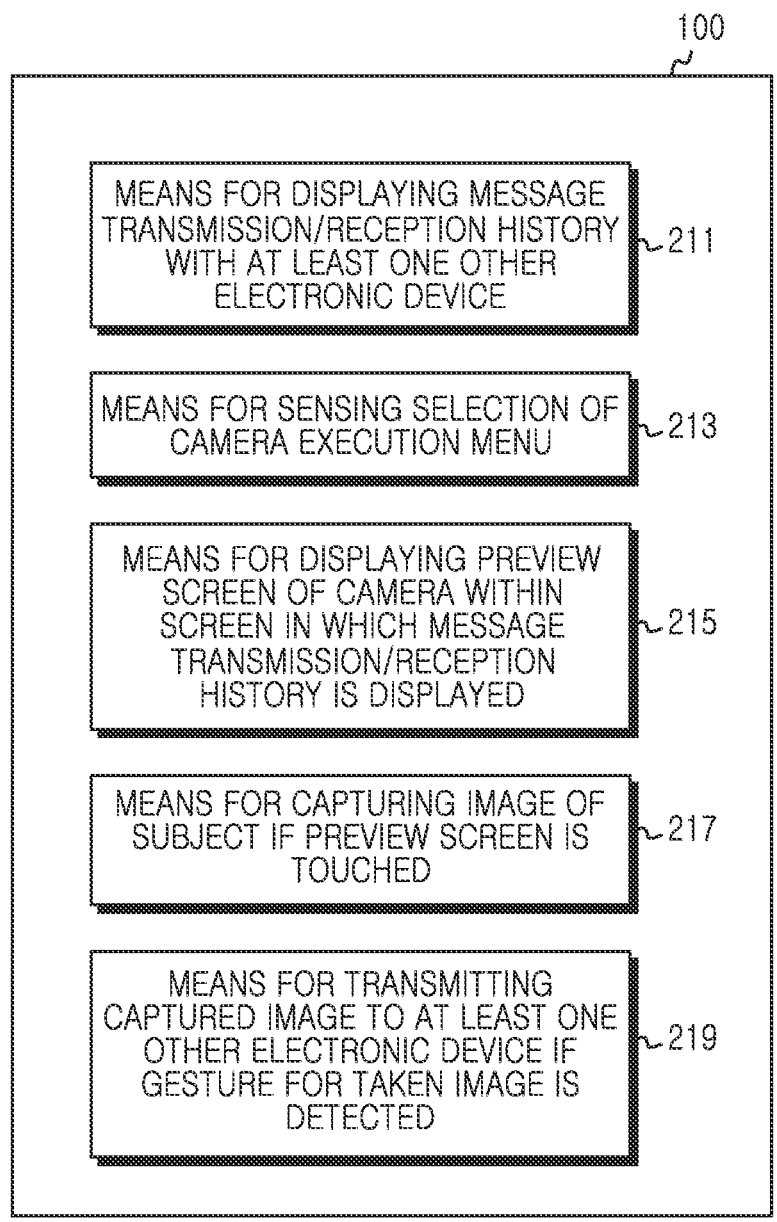
FIG. 2B is a diagram illustrating a means for transmitting a captured image to at least one other electronic device in an electronic device according to an exemplary embodiment of the present invention.

FIG. 2B illustrates a means for transmitting a captured image to at least one other electronic device in an electronic device according to an exemplary embodiment of the present invention.

Referring to FIG. 2B, the electronic device 100 includes a means 211 for displaying a message transmission/reception history with at least one other electronic device, and a means 213 for sensing a selection of a camera execution menu. At this time, the camera 140 can be provided in at least one surface among a front surface of the electronic device 100 and a rear surface thereof. If the camera 140 is provided in all of the front surface and the rear surface, the electronic device 100 basically executes a rear surface camera 140. The electronic device 100 can include a means for changing the executed camera 140 according user control.

Further, the electronic device 100 includes a means 215 for displaying a camera preview screen within a screen in which a message transmission/reception history is displayed.

Also, the electronic device 100 includes a means 217 for, if a touch on a preview screen is sensed, capturing an image of a subject, and includes a means 219 for, if a gesture for a captured image is detected, transmitting the captured image to at least one other electronic device. At this time, the gesture includes at least one of a double tap, a drag, and a tap of a predetermined period of time. The electronic device 100 includes a means for detecting the gesture.

Figure 3:
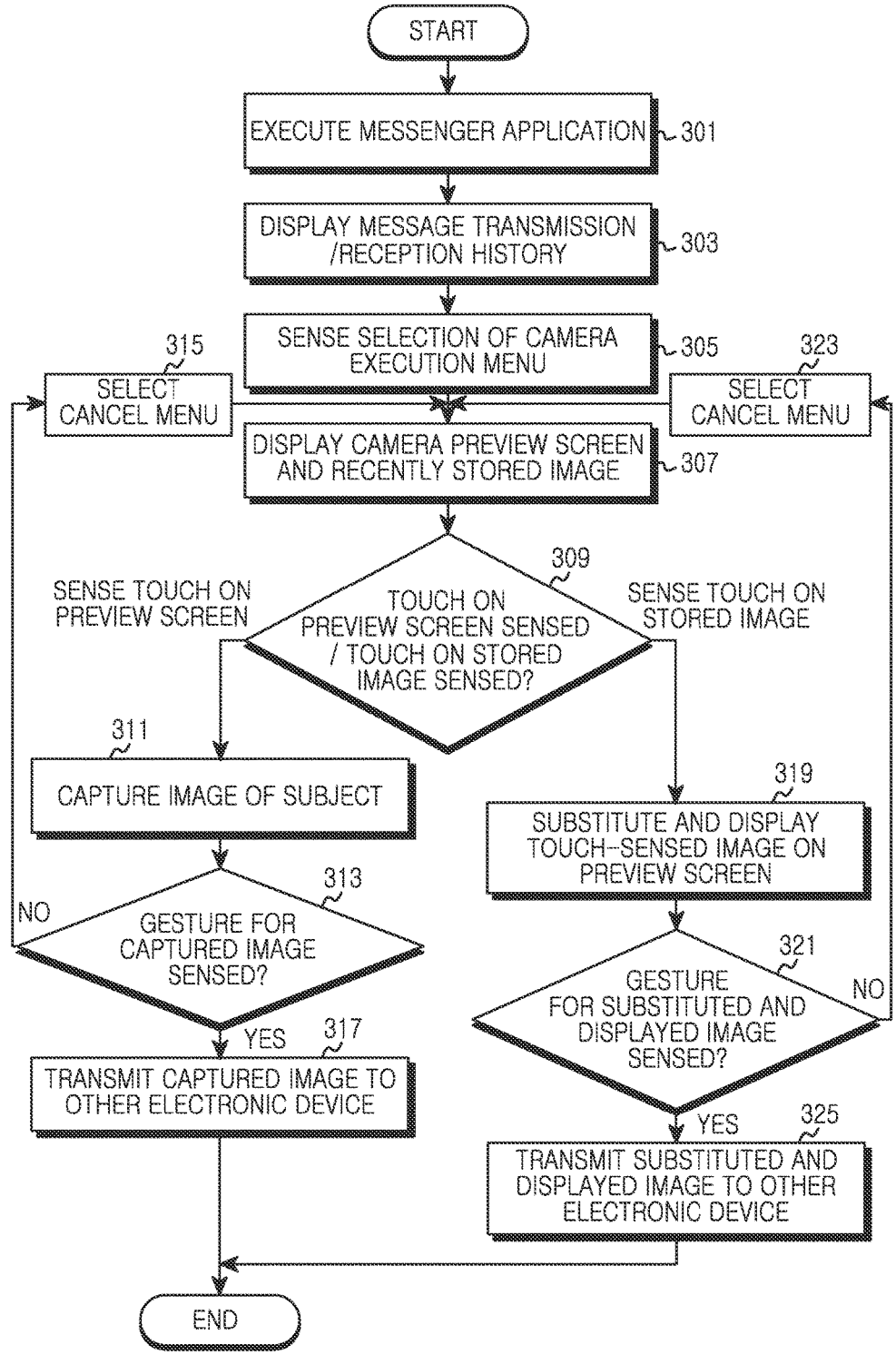
FIG. 3 is a flowchart illustrating a procedure of capturing and transmitting an image within a screen in which a message transmission/reception history is displayed in an electronic device according to an exemplary embodiment of the present invention.

FIG. 3 illustrates a procedure of capturing and transmitting an image within a screen in which a message transmission/reception history is displayed in an electronic device according to an exemplary embodiment of the present invention.

Referring to FIG. 3, the electronic device 100 executes a messenger application in step 301 and then, proceeds to step 303 and displays a message transmission/reception history. At this time, the message transmission/reception history represents a transmission/reception history of a message transmitted/received between a user of the electronic device 100 and a conversation partner of at least one other electronic device. For example, the message transmission/reception history includes at least one of transmission message content, message transmission time, reception message content, message reception time, conversation partner's confirmation or non-confirmation for a transmission message and the like.

After that, in step 305, the electronic device senses a selection of a camera execution menu (e.g., a camera icon). In other words, the electronic device 100 can sense the selection of the camera execution menu displayed within the screen in which the message transmission/reception history is displayed.

Next, the electronic device 100 proceeds to step 307 and displays a camera preview screen and a recently stored image. At this time, the preview screen can be displayed in any region within the screen in which the message transmission/reception history is displayed or can be displayed within a talk balloon in which message content is displayed. For example, the electronic device 100 can display a preview screen in a lower right region within the screen in which the message transmission/reception history is displayed as illustrated in FIGS. 4 to 6.

For another example, the electronic device 100 can display a preview screen within a talk balloon including a transmission message within the screen in which the message transmission/reception history is displayed as illustrated in FIG. 7. Also, the recently stored at least one image can be displayed in any region within the screen in which the message transmission/reception history is displayed or in a region around the preview screen. For example, the electronic device 100 can display recently stored three images among images stored in the data storage unit 111, at a lower end of the preview screen as illustrated in FIG. 8.

Figure 8:
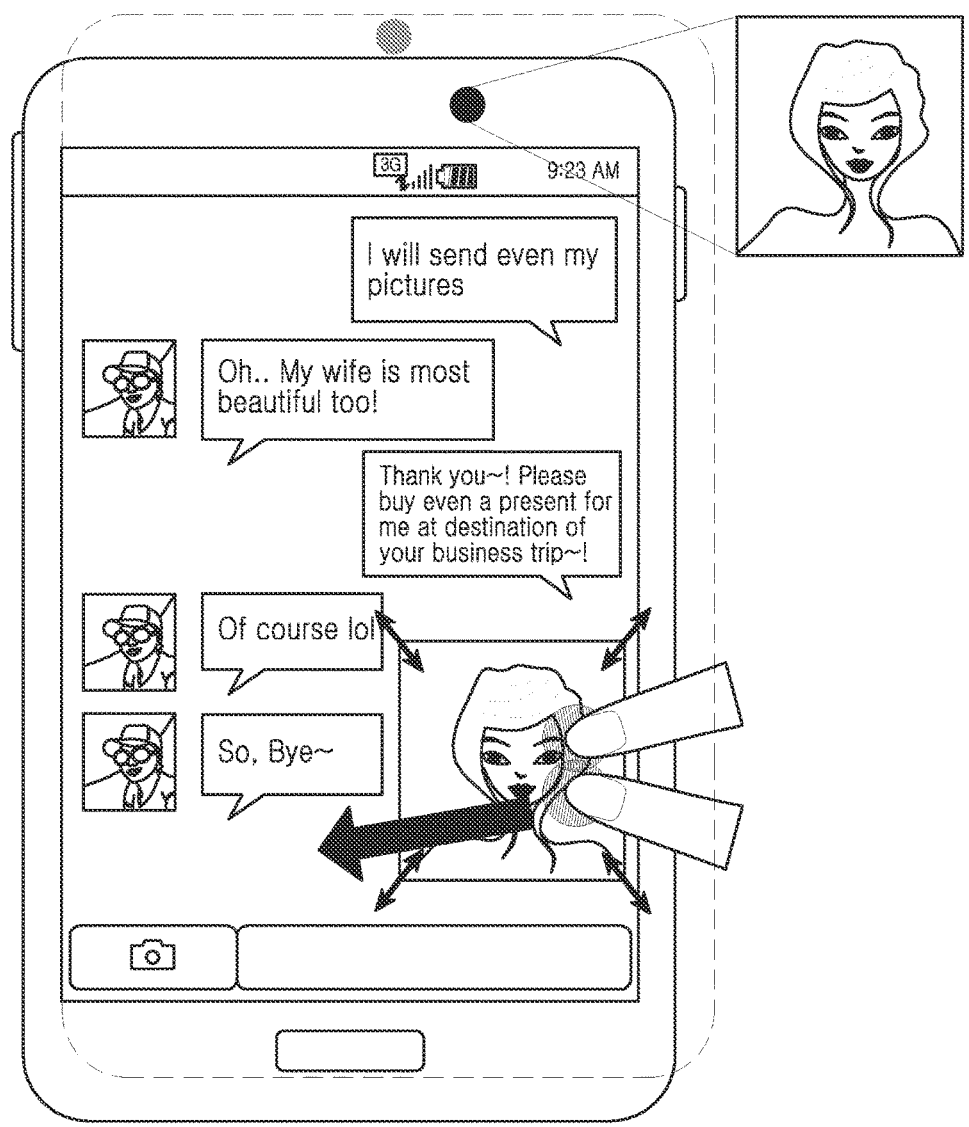
FIG. 8 is a diagram illustrating an example of displaying a recently stored image around a preview screen to transmit the displayed image in an electronic device according to an exemplary embodiment of the present invention.

FIG. 8 is a diagram illustrating an example of displaying a recently stored image around a preview screen to transmit the displayed image in an electronic device according to an exemplary embodiment of the present invention.

Figure 5:
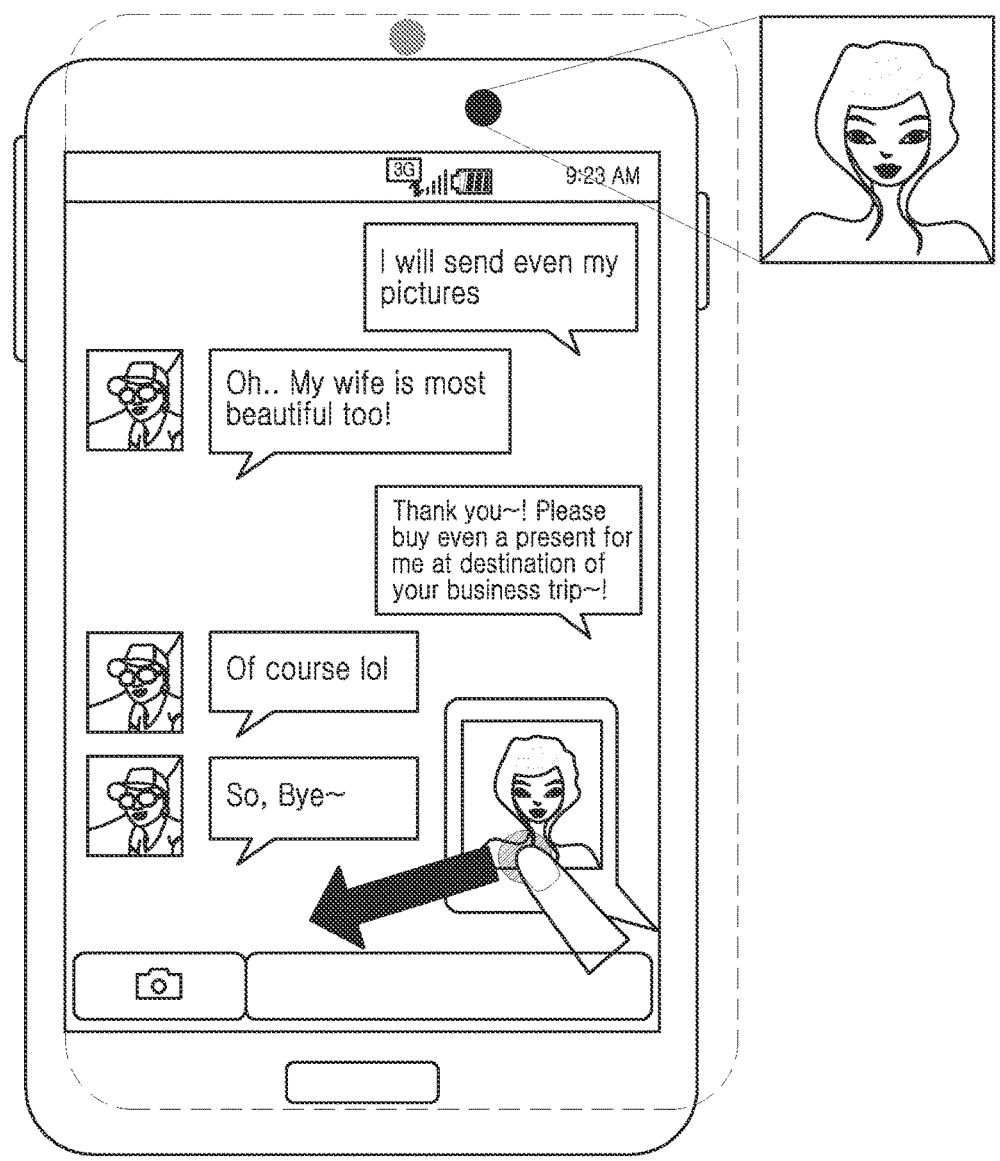
FIG. 5 is a diagram illustrating an example of adjusting a size of a preview screen and a location thereof in an electronic device according to an exemplary embodiment of the present invention.

FIG. 5 is a diagram illustrating an example of adjusting a size of a preview screen and a location thereof in an electronic device according to an exemplary embodiment of the present invention.

At this time, as illustrated in FIG. 5, if a multi touch on the preview screen is sensed, the electronic device 100 can adjust a size of the preview screen and a location thereof according to the sensed multi touch. For example, if the multi touch sensed for the preview screen region is dragged to as to be getting distant from each other, the electronic device 100 can zoom in a preview screen region depending on progress lengths of the sensed drags and progress locations thereof. Particularly, if the drags sensed for the preview screen region make progress a preset threshold distance or more, the electronic device 100 zooms in the preview screen region by as much as a size of a screen in which a message transmission/reception history is displayed, thereby being capable of obtaining the same effect as the preview screen is a wallpaper screen of the screen in which the message transmission/reception history is displayed as illustrated in FIG. 9. For another example, if the sensed multi touch on the preview screen region is dragged to as to be getting closer to each other, the electronic device 100 can zoom out an image displayed in the preview screen region depending on progress lengths of the sensed drags and/or progress locations thereof. For further example, if at least two or more drags making progress in the same direction about the preview screen region are sensed, the electronic device 100 can move the preview screen according to locations of the sensed drags.

After that, the electronic device 100 proceeds to step 309 and determines whether a touch on a preview screen is sensed or whether a touch on a stored image is sensed.

If the touch on the preview screen is sensed in step 309, the electronic device 100 proceeds to step 311 and captures an image of a subject. At this time, after capturing the subject, the electronic device 100 can convert the preview screen into a screen displaying a captured image. That is, the electronic device 100 can display the captured image instead of the preview screen in a region in which the preview screen is displayed. Here, if the preview screen region is zoomed in by as much as a size of the screen in which the message transmission/reception history is displayed according to user control, the electronic device 100 can capture the image of the subject, when a touch is sensed on a region in which the message transmission/reception history is not displayed. Further, if a current capturing mode is a video capturing mode, after sensing a touch of a predetermined period of time on the preview screen, the electronic device 100 can capture a video while the sensed touch is maintained.

Next, the electronic device 100 proceeds to step 313 and determines if a gesture for the captured image is sensed. At this time, the gesture includes at least one of a double tap, a drag, and a tap of a predetermined period of time. Here, the captured image is a meaning including the captured video.

If it is determined in step 313 that the gesture for the captured image is not sensed, the electronic device 100 senses a selection of a cancel menu in step 315 and then, returns to step 307 and again performs the subsequent steps.

On contrary, if it is determined in step 313 that the gesture for the captured image is sensed, the electronic device 100 proceeds to step 317 and transmits the captured image to at least one other electronic device and then, terminates the procedure according to the present exemplary embodiment. For example, as illustrated in FIG. 6, the electronic device 100 can sense a drag for a captured image displayed in the preview screen region, to transmit the captured image to at least one other electronic device. For another example, as illustrated in FIG. 7, the electronic device 100 can sense a drag for a captured image displayed in the preview screen region within a talk balloon including a transmission message, to transmit the captured image displayed in the preview screen region to at least one other electronic device.

At this time, the electronic device 100 can split a screen region in which a message transmission/reception history is displayed into at least two regions and then, store and transmit a corresponding image depending on which screen region among the split screen regions a drag sensed for an image makes progress to.

Figure 10:
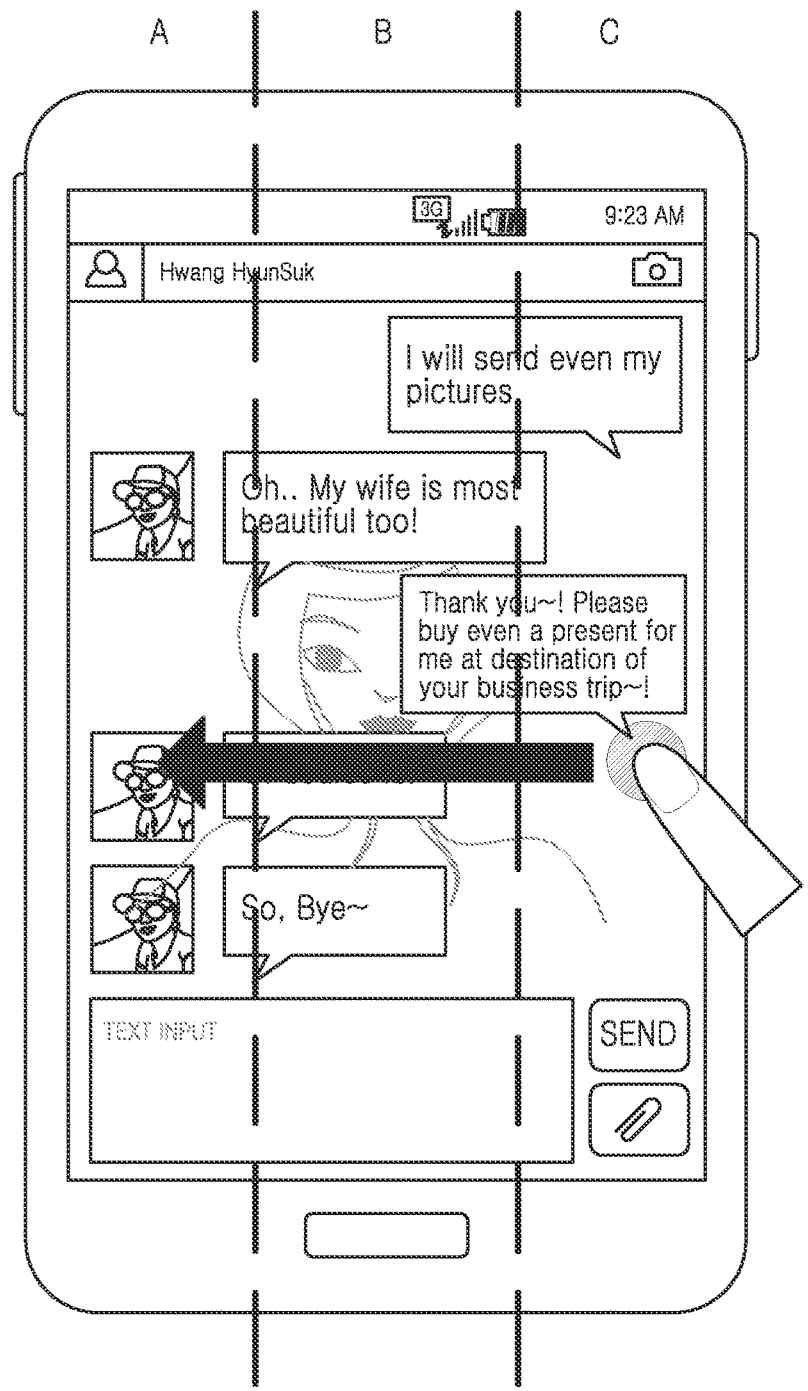
FIG. 10 is a diagram illustrating an example of storing and transmitting an image depending on a progress region of a drag of the image in an electronic device according to an exemplary embodiment of the present invention.

FIG. 10 is a diagram illustrating an example of storing and transmitting an image depending on a progress region of a drag of the image in an electronic device according to an exemplary embodiment of the present invention.

For example, as illustrated in FIG. 10, the electronic device 100 can split a screen region in which a message transmission/reception history is displayed into regions 'A', 'B', and 'C' and then, store and transmit a corresponding image depending on which region among the regions 'A', 'B', and 'C' the drag sensed for the image makes progress to. At this time, if a drag sensed for a captured image makes progress only within the region 'C', the electronic device 100 can store the captured image in the memory 100 and, if the drag sensed for the captured image starts from the region 'C' and makes progress to the region 'B', the electronic device 100 can store the captured image in the memory 110 and concurrently transmit the captured image to at least one other electronic device. Also, if the drag sensed for the captured image starts from the region 'C' and makes progress to the region 'A', the electronic device 100 can transmit the captured image to at least one other electronic device without storing the captured image in the memory 110.

Figure 11:
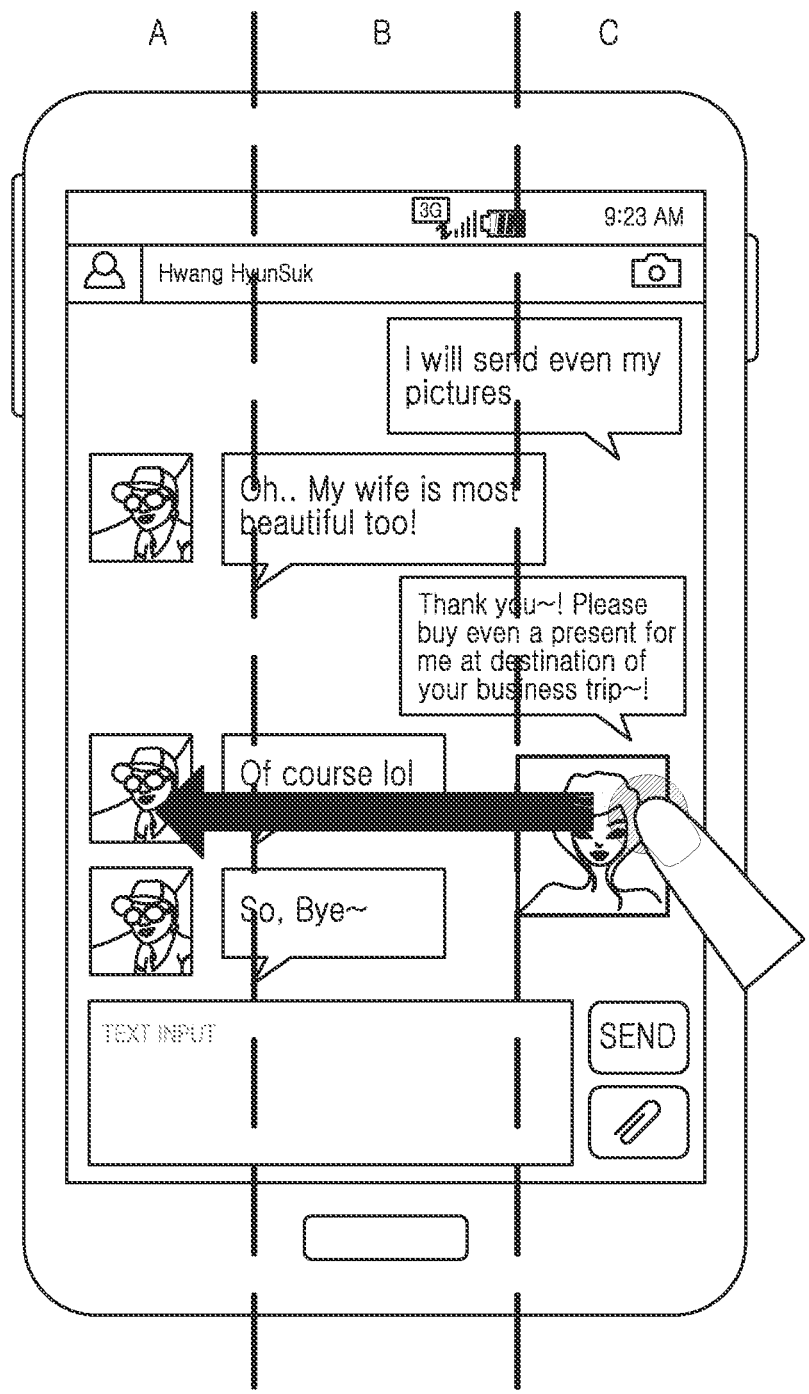
FIG. 11 is a diagram illustrating an example of storing and transmitting a video depending on a progress region of a drag of the video in an electronic device according to an exemplary embodiment of the present invention.

FIG. 11 is a diagram illustrating an example of storing and transmitting a video depending on a progress region of a drag of the video in an electronic device according to an exemplary embodiment of the present invention.

For another example, as illustrated in FIG. 11, the electronic device 100 can split a screen region in which a message transmission/reception history is displayed into regions 'A' and 'B' and then, store and transmit a captured video depending on which region among the regions 'A' and 'B' the drag sensed for the captured video makes progress to. If a drag sensed for a captured video makes progress only within the region 'B', the electronic device 100 can store the captured video in the memory 100 and, if the drag sensed for the captured video starts from the region 'B' and makes progress to the region 'A', the electronic device 100 can store the captured video in the memory 110 and concurrently transmit the captured video to at least one other electronic device.

Also, in a state where an image is captured after a preview screen region is zoomed in by as much as a size of a screen in which a message transmission/reception history is displayed, the electronic device 100 can sense a touch on a region in which the message transmission/reception history is not displayed, and store and transmit the captured image depending on which screen region the sensed touch is dragged to.

Figure 12:
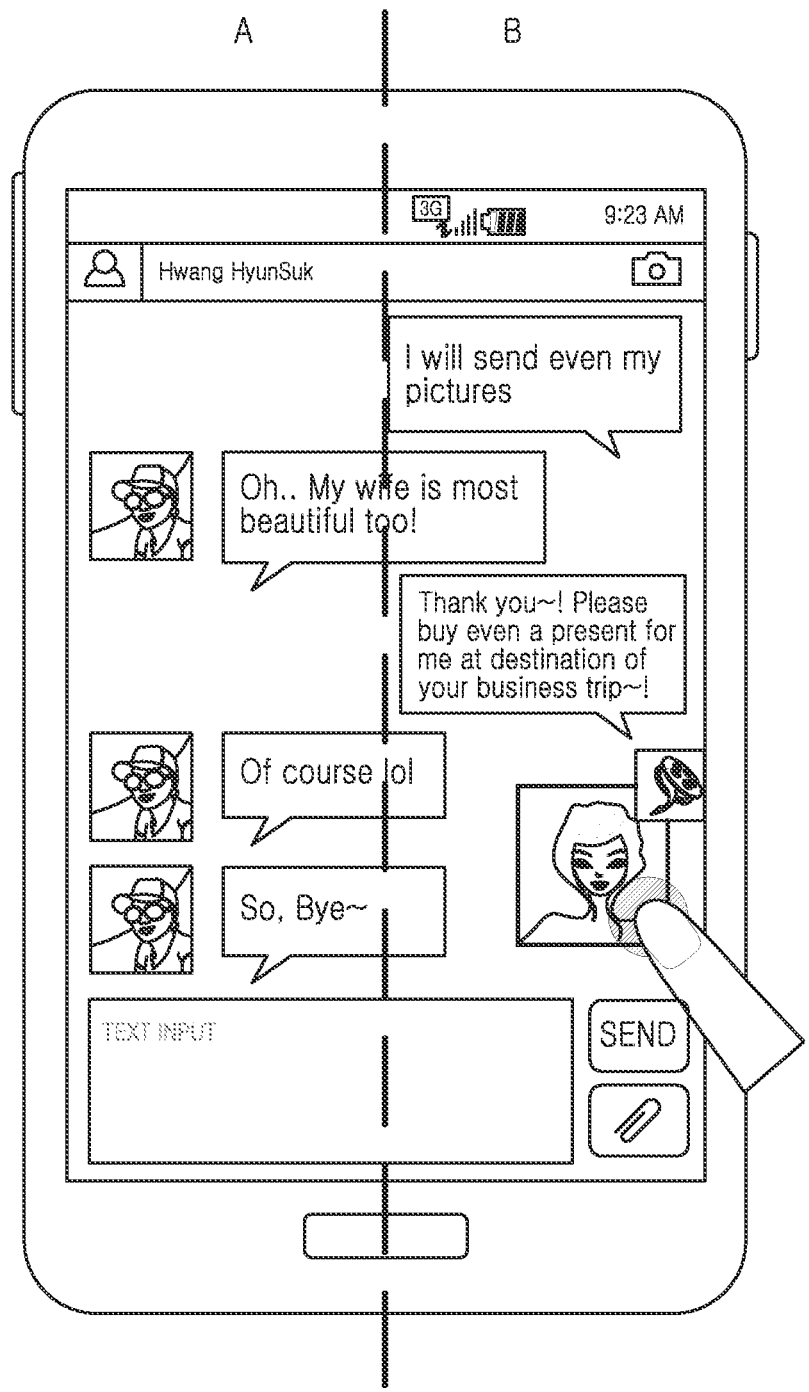
FIG. 12 is a diagram illustrating an example of storing and transmitting a zoomed-in image depending on a progress region of a drag of the zoomed-in image in an electronic device according to an exemplary embodiment of the present invention.

FIG. 12 is a diagram illustrating an example of storing and transmitting a zoomed-in image depending on a progress region of a drag of the zoomed-in image in an electronic device according to an exemplary embodiment of the present invention.

For example, as illustrated in FIG. 12, the electronic device 100 can split a screen region in which a message transmission/reception history is displayed into regions 'A', 'B', and 'C' and then, store and transmit a captured image depending on which region among the regions 'A', 'B', and 'C' a touch generated in a region in which a message transmission/reception history is not displayed is dragged to. If the touch for the region in which the message transmission/reception history is not displayed is dragged only within the region 'C', the electronic device 100 can store the captured image in the memory 100. For another example, if the touch for the region in which the message transmission/reception history is not displayed is sensed within the region 'C' and is dragged to the region 'B', the electronic device 100 can store the captured image in the memory 110 while transmitting the captured image to at least one other electronic device. For further example, if the touch for the region in which the message transmission/reception history is not displayed is sensed within the region 'C' and is dragged to the region 'A', the electronic device 100 can transmit the captured image to at least one other electronic device without storing the captured image in the memory 110.

If the touch on the stored image is sensed in step 309, the electronic device 100 proceeds to step 319 and substitutes and displays the touch-sensed image in the preview screen region. In detail, if a touch on a specific image among images displayed around the preview screen is sensed, the electronic device 100 can display the touch-sensed specific image in the preview screen region. At this time, if the preview screen region is greater than a recently stored image display region, the touch-sensed specific image can be zoomed in and displayed according to a size of the preview screen region.

Next, the electronic device 100 proceeds to step 321 and determines if a gesture for the substituted and displayed image is sensed. At this time, the gesture includes at least one of a double tap, a drag, and a tap of a predetermined period of time, and can be the same gesture as the gesture for transmitting the captured image.

If it is determined in step 321 that the gesture for the substituted and displayed image is not sensed, the electronic device senses a selection of a cancel menu in step 323 and then, returns to step 307 and again performs the subsequent steps.

On contrary, if it is determined in step 321 that the gesture for the substituted and displayed image is sensed, the electronic device 100 proceeds to step 325 and transmits the substituted and displayed image to at least one other electronic device and then, terminates the procedure according to the present exemplary embodiment. At this time, if a gesture for image transmission is sensed for an image displayed around the preview screen as illustrated in FIG. 8, the electronic device 100 can transmit the gesture-sensed image to at least one other electronic device without a process of substituting and displaying the gesture-sensed image in the preview screen region.

Exemplary embodiments of the present invention described in this specification and all function operations thereof can be implemented by computer software including structures disclosed in this specification and equivalent structures thereof, firmware, hardware or a combination of one or more of them. Also, the exemplary embodiments of the present invention described in this disclosure can be implemented by one or more computer program products, i.e., data processing devices, or can be implemented by one or more modules of computer program instructions encoded on a non-transitory computer readable medium for controlling operations of these devices.

The non-transitory computer readable medium can be a machine readable storage medium, a machine readable storage substrate, a memory device, a construction of substance affecting a machine readable radio wave stream, or a combination of one or more of them. The term of data processing device includes, for example, a programmable processor, a computer or multi-processor, or all data processing equipment, devices and machines including the computer. The equipment can include a code added to hardware and generating an execution environment for a corresponding computer program, for example, a code constructing a processor firmware, a protocol stack, a database management system, an operation system, or a combination of one or more of them.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for use in an electronic device, the method comprising:
   displaying a window associated with a messenger application, the window including a message display region and an input region;
   displaying one or more of a sent message and a received message in the message display region in the window associated with the messenger application;
   detecting a first touch input to the window associated with the messenger application, the first touch input for enabling a selection of an image for sending to at least one other electronic device;
   displaying, after the detecting of the first touch input and without an additional user input, a preview screen and one or more recently stored images while at least a portion of the message display region displaying the sent message and the received message is displayed;
   detecting a second touch input associated with the messenger application, the second touch input being associated with selecting an image among the one or more recently stored images; and
   transmitting the selected image to the at least one other electronic device.

2. The method of claim 1, wherein each of the one or more recently stored images corresponds to one of a still image and a video.

3. The method of claim 1, further comprising:
   displaying a representation of the selected image in the message display region of the window associated with the messenger application.

4. The method of claim 3, wherein the representation of the selected image is displayed in a location after the one or more of the sent message and the received message in the message display region.

5. The method of claim 1, wherein the first touch input corresponds to a touch on a camera icon displayed in the window associated with the messenger application.

6. An electronic device comprising:
   one or more processors configured to execute one or more programs;
   a touch sensing display configured to detect the presence and location of a touch; and
   a memory configured to store data and instructions,
   wherein the one or more programs are stored in the memory and comprise instructions to:
      display a window associated with a messenger application, the window including a message display region and an input region,
      display one or more of a sent message and a received message in the message display region in the window associated with the messenger application,
      detect a first touch input to the window associated with the messenger application, the first touch input for enabling a selection of an image for sending to at least one other electronic device,
      display, after the detection of the first touch input and without an additional user input, a preview screen and one or more recently stored images while at least a portion of the message display region displaying the sent message and the received message is displayed, detect a second touch input to the window associated with the messenger application, the second touch input being associated with selecting an image among the one or more recently stored images, and transmit the selected image to the at least one other electronic device.

7. The electronic device of claim 6, wherein each of the one or more recently stored images corresponds to one of a still image and a video.

8. The electronic device of claim 6, wherein the one or more programs further comprise instructions to display a representation of the selected image in the message display region of the window associated with the messenger application.

9. The electronic device of claim 8, wherein the instructions to display a representation of the selected image in the message display region of the window associated with the messenger application comprise instructions to display the representation of the selected image in a location after the one or more of the sent message and the received message in the message display region.

10. The electronic device of claim 6, wherein the first touch input corresponds to a touch on a camera icon displayed in the window associated with the messenger application.

11. A method for use in an electronic device, the method comprising:
displaying a window associated with a messenger application, the window including a message display region and an input region;
displaying one or more of a sent message and a received message in the message display region in the window associated with the messenger application;
detecting a first touch input to the window associated with the messenger application, the first touch input for enabling a selection of an image for sending to at least one other electronic device;
in response to the detecting of the first touch input and without an additional user input, displaying a preview screen and one or more recently stored images while at least a portion of the message display region displaying the sent message and the received message is displayed;
detecting a second touch input associated with the messenger application, the second touch input being associated with selecting an image among the one or more recently stored images; and
transmitting the selected image to the at least one other electronic device.

12. An electronic device comprising:
one or more processors configured to execute one or more programs;
a touch sensing display configured to detect the presence and location of a touch; and
a memory configured to store data and instructions,
wherein the one or more programs are stored in the memory and comprise instructions to:
display a window associated with a messenger application, the window including a message display region and an input region,
display one or more of a sent message and a received message in the message display region in the window associated with the messenger application,
detect a first touch input to the window associated with the messenger application, the first touch input for enabling a selection of an image for sending to at least one other electronic device,
in response to the detection of the first touch input and without an additional user input, display a preview screen and one or more recently stored images while at least a portion of the message display region displaying the sent message and the received message is displayed,
detect a second touch input to the window associated with the messenger application, the second touch input being associated with selecting an image among the one or more recently stored images, and transmit the selected image to the at least one other electronic device.

13. A method for use in an electronic device, the method comprising:
displaying a window associated with a messenger application, the window including a message display region and an input region;
displaying one or more of a sent message and a received message in the message display region in the window associated with the messenger application;
detecting a first touch input to the window associated with the messenger application, the first touch input for enabling a selection of an image for sending to at least one other electronic device;
displaying, after the detecting of the first touch input and without an additional user input, a preview screen and one or more recently stored images while at least a portion of the message display region displaying the sent message and the received message is displayed;
detecting a second touch input associated with the messenger application, the second touch input being associated with selecting an image among the one or more recently stored images;
in response to the detecting of the second touch input, displaying the selected image in the message display region while at least a portion of the message display region displaying the sent message and the received message is displayed;
detecting a third touch input associated with the messenger application, the third touch input being associated with transmitting the selected image to the at least one electronic device; and
in response to the detecting of the third touch input, transmitting the selected image to the at least one other electronic device.

14. An electronic device comprising:
one or more processors configured to execute one or more programs;
a touch sensing display configured to detect the presence and location of a touch; and
a memory configured to store data and instructions,
wherein the one or more programs are stored in the memory and comprise instructions to:
display a window associated with a messenger application, the window including a message display region and an input region,
display one or more of a sent message and a received message in the message display region in the window associated with the messenger application,
detect a first touch input to the window associated with the messenger application, the first touch input for enabling a selection of an image for sending to at least one other electronic device, display, after the detection of the first touch input and without an additional user input, a preview screen and one or more recently stored images while at least a portion of the message display region displaying the sent message and the received message is displayed, detect a second touch input to the window associated with the messenger application, the second touch input being associated with selecting an image among the one or more recently stored images, in response to the detecting of the second touch input, display the selected image in the message display region while at least a portion of the message display region displaying the sent message and the received message is displayed, detect a third touch input associated with the messenger application, the third touch input being associated with transmitting the selected image to the at least one electronic device, and in response to the detecting of the third touch input, transmit the selected image to the at least one other electronic device.

15. An electronic device comprising:

one or more processors configured to execute one or more programs;

a touch sensing display configured to detect the presence and location of a touch; and a memory configured to store data and instructions, wherein the one or more programs are stored in the memory and comprise instructions to:

display a window associated with a messenger application, the window including a message display region and an input region, display one or more of a sent message and a received message in the message display region in the window associated with the messenger application, detect a first touch input to the window associated with the messenger application, the first touch input for enabling a selection of an image for sending to at least one other electronic device, display, after the detection of the first touch input and without an additional user input, a preview screen and one or more recently stored images while at least a portion of the message display region displaying the sent message and the received message is displayed, detect a second touch input to the window associated with the messenger application, the second touch input being associated with selecting an image among the one or more recently stored images, display a representation of the selected image in the message display region of the window associated with the messenger application, and transmit the selected image to the at least one other electronic device.

* * * * *